(No Model.)
L. P. DE LUZE.
DEVICE FOR CATCHING INSECTS.
No. 289,997. Patented Dec. 11, 1883.
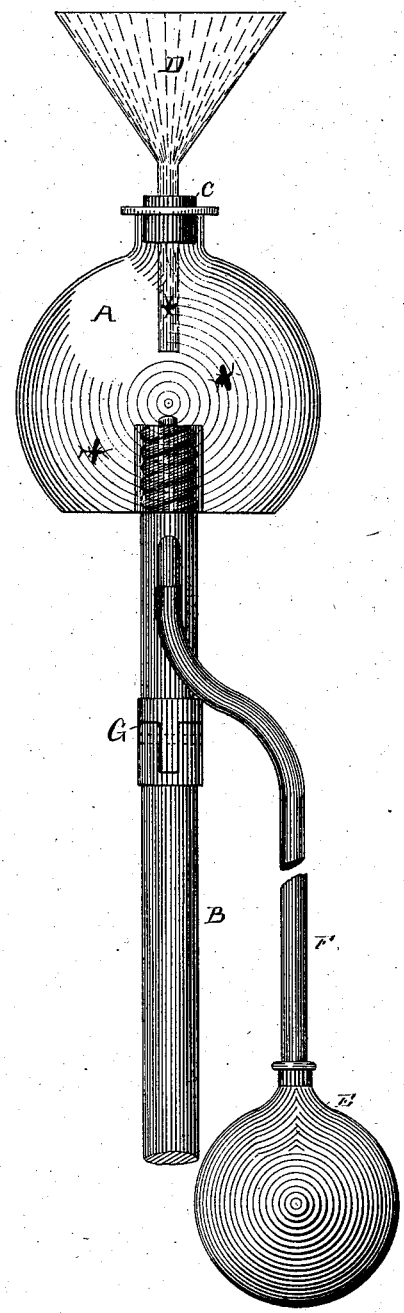
WITNESSES:
Louis Kuebler.
Victor Balas
INVENTOR
Louis P. de Luze
by his attorney
Chas A. Rutter

UNITED STATES PATENT OFFICE.

LOUIS P. DE LUZE, OF NEW ROCHELLE, NEW YORK, ASSIGNOR OF ONE-HALF TO GEORGE W. HUNT, OF PHILADELPHIA, PA.

DEVICE FOR CATCHING INSECTS.

SPECIFICATION forming part of Letters Patent No. 289,997, dated December 11, 1883.

Application filed April 3, 1883. (No model.)

*To all whom it may concern:*

Be it known that I, LOUIS P. DE LUZE, a citizen of the United States, and a resident of New Rochelle, in the county of Westchester and State of New York, have invented a new and useful Device for Catching Insects, of which the following is a specification.

The object of my invention is to provide a device by means of which mosquitoes, flies, and other insects may be caught, either to rid a room or other place of them, or for the purposes of the naturalist.

The accompanying drawing, forming part of this specification, illustrates my invention, and from which it will be observed, that it consists of a receiver, A, of glass or any other suitable material, which is supported upon a handle, B, of a proper length. This receiver has upon its top a neck, which is fitted with a cork, C, through which the stem of the funnel D passes to the interior of the chamber.

The form of the invention shown in the illustration is operated by first compressing the rubber ball E, which is connected with the interior of the receiver, by means of a pipe, F, and then approaching the funnel as near as possible to the insect, and then releasing the ball. This causes a rush of air down the stem of the tunnel, which takes the insect with it to the interior of the receiver, where it becomes imprisoned. If it be found more convenient, the pipe F may be attached to an elbow opening into the stem of the funnel, and by compressing the ball a rush of air would be caused to pass down the stem of the funnel. In this case there should be an opening in the bottom of the receiver covered with gauze or some other suitable material, to allow the escape of the air from the receiver, and prevent the escape of any insects which might be in said receiver.

It will be understood that I do not desire to limit myself to the use of the rubber ball E for operating my device, as any form of air-pump will answer quite as well.

In order to catch an insect which may be upon a wall instead of upon a ceiling, I have the handle upon which my device is carried pivoted, so that the funnel may be inclined at any angle to the handle.

Having thus described my invention, I claim—

1. The herein-described device for catching insects, consisting of a receiver, A, funnel D, and suitable apparatus for producing a blast of air in the funnel-stem by suction or propulsion, substantially as set forth.

2. The combination, in a device for catching insects, of the receiver A, funnel D, pipe F, hollow elastic air-bulb E, and handle B, all substantially as and for the purposes described.

L. P. DE LUZE.

Witnesses:
C. H. DE LUZE,
R. M. HARISON.